United States Patent [19]

Sutter et al.

[11] Patent Number: 5,129,665
[45] Date of Patent: Jul. 14, 1992

[54] BICYCLE FRAME WITH ONE OR TWO IMPROVED WISHBONE STAYS

[75] Inventors: Edmund E. Sutter; George E. Clarke; Randy D. Kurth, all of Janesville, Wis.

[73] Assignee: Roadmaster Corporation, Olney, Ill.

[21] Appl. No.: 616,420

[22] Filed: Nov. 21, 1990

[51] Int. Cl.$^5$ ............................................. B62K 19/38
[52] U.S. Cl. ............................... 280/274; 280/281.1; 280/284; 280/288; 188/24.11; 188/24.12
[58] Field of Search ...................... 280/281.1, 288, 284, 280/279, 274, 285; 188/24.11, 24.12

[56] References Cited

U.S. PATENT DOCUMENTS

| | | | |
|---|---|---|---|
| 614,905 | 11/1898 | Sturges | 280/281.1 |
| 660,981 | 10/1900 | Barnes | |
| 747,789 | 12/1903 | Somerby | |
| 1,502,890 | 7/1924 | Veasey | 403/233 |
| 2,353,712 | 7/1944 | Dewey | 280/281 |
| 4,389,055 | 6/1983 | Cockburn | 280/274 |
| 4,421,337 | 12/1983 | Pratt | 280/284 |
| 4,511,018 | 4/1985 | Scott | 188/24.12 |
| 4,705,286 | 11/1987 | Lauzier et al. | 280/281 R |
| 4,805,742 | 2/1989 | Sato | 188/24.11 |
| 4,813,591 | 3/1989 | Mueller et al. | 228/173.4 |
| 4,850,607 | 7/1989 | Trimble | 280/281.1 |
| 4,902,160 | 2/1990 | Jeng | 403/205 |
| 4,902,458 | 2/1990 | Trimble | 264/46.6 |

OTHER PUBLICATIONS

Roadmaster brochures, undated, for bicycle Models 2528, 2524, 2519V, 2521, 2522 and 2526.
Timberlin brochure, undated, noting a "Tange MTB Double Butted Cro-moly Mono-stay frame."
Schwinn brochure, undated, including pp. 5, 15 and 22, captioned "Aluminum Frames, A Breed Apart".
Raleigh brochure, undated, pp. 20 and 21, titled "Technium Mountain Bikes Reach a New Summit."

Primary Examiner—Charles A. Marmor
Assistant Examiner—Anne Marie Buehler
Attorney, Agent, or Firm—Willian Brinks Olds Hofer Gilson & Lione

[57] ABSTRACT

A bicycle frame with improved rigidity and strength is disclosed. The frame has a truss portion and upper and lower stays for connecting a rear wheel to the truss portion of the frame. One or both of the stays comprise a U-shaped tubular member having a curved portion and two leg portions, the leg portions positioned to straddle the rear wheel, and a second tubular member extending between the truss portion of the frame and the curved portion of the U-shaped tubular member. The second tubular member is shaped at one end so as to terminate in gussets that at least partially surround the curved portion of the U-shaped member. In preferred embodiments, the second tubular member is flattened at the end connecting to the U-shaped tubular member to have an elliptical cross-section with an inside minor axis dimension substantially equal to the outside diameter of the U-shaped tubular member, and the gussets terminate at about the centerline of the U-shaped tubular member. Also in the preferred embodiment, an annular tube spacer is placed inside the second tubular member so as to be concentric with mounting holes formed through the front and back walls of the flattened portion of the second tubular member. The mounting holes allows a brake assembly (on the upper stay) or a kickstand assembly (on the lower stay) to be bolted to the stay without fear of collapsing the tube walls.

26 Claims, 3 Drawing Sheets

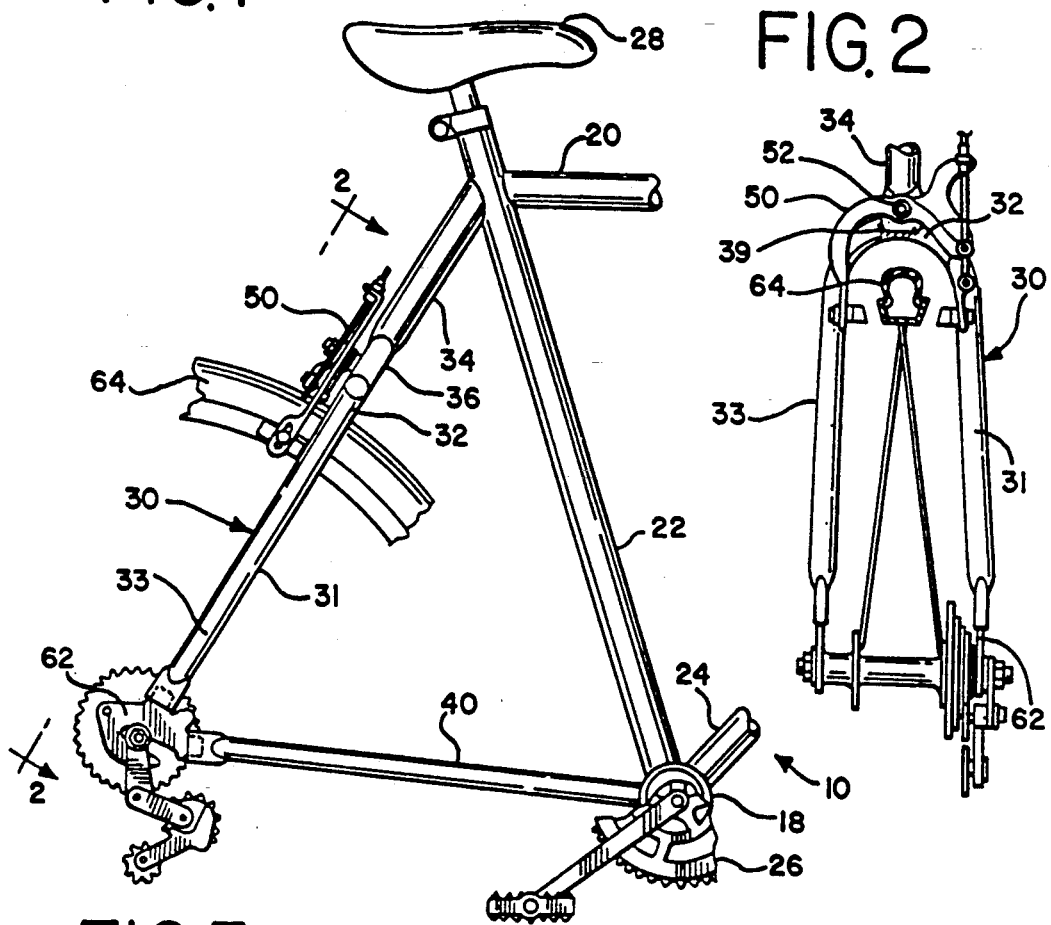
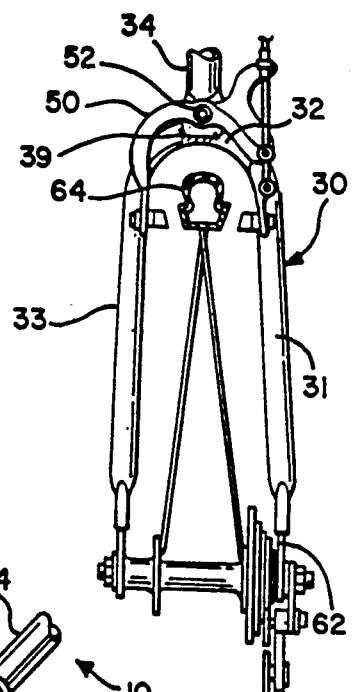
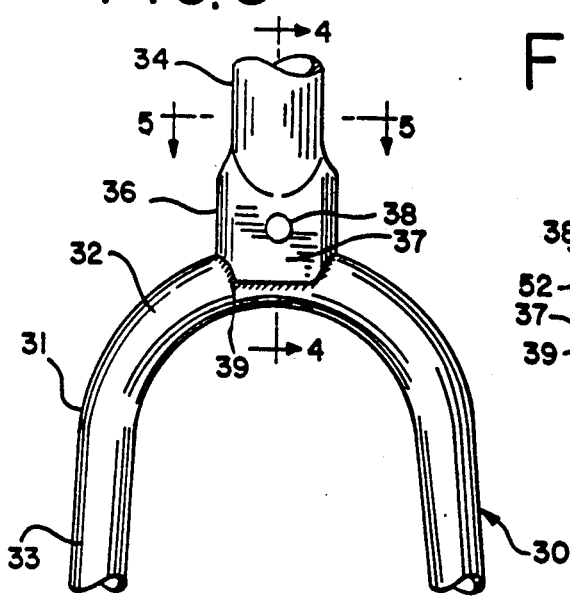
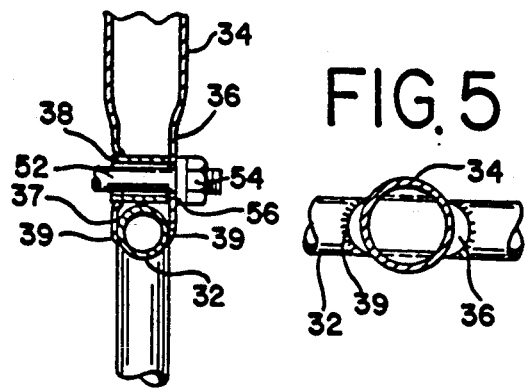
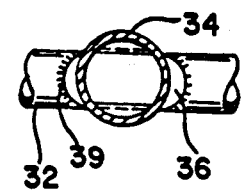

FIG. 6
FIG. 7
FIG. 8
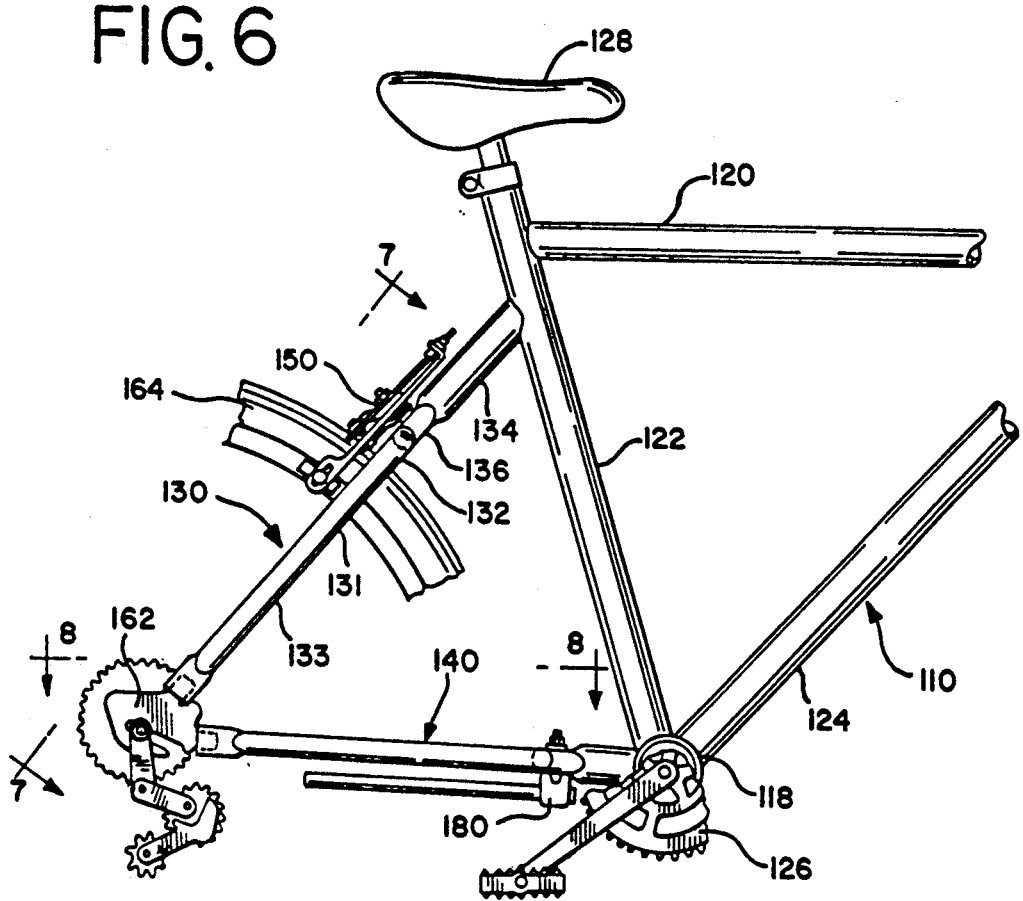
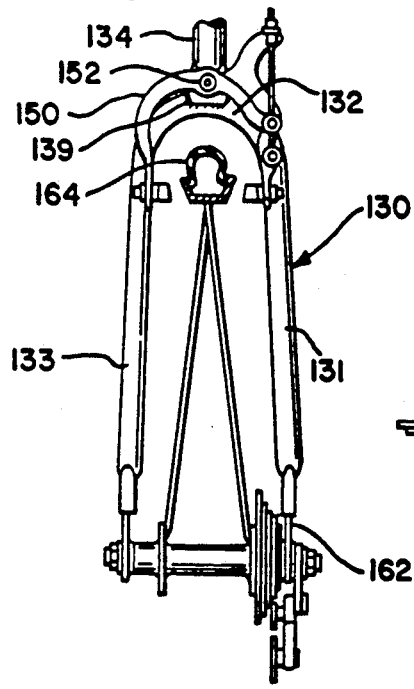
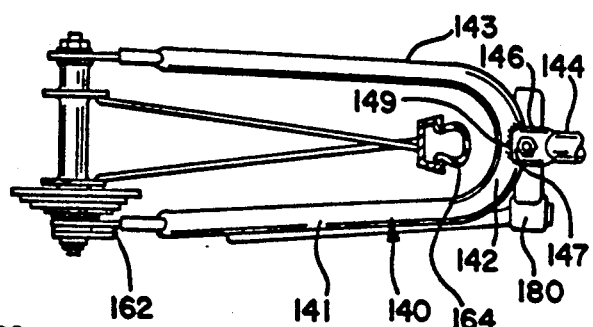

BICYCLE FRAME WITH ONE OR TWO IMPROVED WISHBONE STAYS

BACKGROUND OF THE INVENTION

The present invention relates to bicycle frames, and more particularly to bicycle frames having increased rigidity and strength using an improved wishbone construction for one or both of the upper and lower rear stays.

Bicycle frames generally comprise a truss portion and upper and lower rear stays. The truss portion is made up of a pedal crank housing with a seat mast extending upwardly therefrom; a head tube, used for mounting the handlebars and front wheel forks; a top tube extending between the top portion of the seat mast and the head tube; and a down tube connecting the pedal crank housing and head tube. The upper and lower rear stays form a triangle with the truss portion and the rear wheel mounting brackets (commonly known as rear drop outs), with the upper stay connecting the rear wheel brackets to the upper portion of the seat mast and the lower stays connecting the rear wheel brackets to the pedal crank housing.

The rigidity of the frame affects the ease with which the bicycle can be pedaled. If the frame is not rigid, some of the energy expended during pedaling is used to cause deflection of the frame, rather than propelling the bike forward. This problem is particularly noticeable when pedaling light-weight "mountain bike" frames over uneven terrain. Of course, there are limits on the desired rigidity, particularly when increased rigidity can only be achieved with increased frame weight.

A number of bicycle frames have recently been manufactured using a "wishbone" shaped upper stay. Whereas prior art stays consisted of two separate pieces of tubing extending between the seat mast and the rear wheel brackets, wishbone stays have a U-shaped section, with separate tubes straddling the rear wheel, and a stem tube where the two side tubes are tied together. The stem tube connects on its other end to the seat mast.

These wishbone stays have generally consisted of three separate members, the two separate side tubes forming the legs of the U-shaped member, and the stem tube. Different configurations for attaching the two side tubes to the stem tube have been devised. One configuration requires bending the tops of the two side tubes inwardly and welding them to the sides of the stem tube. Another configuration uses a stem tube with a large, flared bottom end into which the ends of the two side tubes are inserted. A third configuration uses a cast wishbone lug for tying the three pieces together. These designs each have weaknesses due to the three piece nature of the rear stays.

Currently, many child-sized bicycles use a one piece, U-shaped tubular member for one or both of the rear stays. This design has not been used on adult bicycles primarily because the weld between the tubular member and seat mast or pedal crank housing is not very strong, due to the fact that there can only be point contact between the oppositely curved pieces being welded.

Some patented frame designs have used a single piece of tubing in a U shape to form forks for a bicycle. For example, U.S. Pat. No. 614,905 to Sturges discloses a lower rear stay constructed, in part, of a U-shaped tube. However, the U-shaped tube is connected to the pedal crank housing by a two piece yoke, which in turn is apparently held together by being inserted into a tubular portion extending from the pedal crank housing.

U.S. Pat. No. 2,353,712 to Dewey discloses front forks of a bicycle made from an unusually shaped tube that is larger in diameter in its central section, where it is flattened to an elliptical cross section, than at its ends. The tube is also bent into a U-shape. A similar U-shaped member is used for the front and rear stays. The U-shaped members, in each instance, are connected to the frame by a piece of tubing inserted through a hole in the top of the flattened, curved portion of the U-shaped member, and held in place by a ring weld.

These patented prior art designs are each more complicated, and would appear to provide less strength and rigidity to the frame than currently used wishbone stays. While the wishbone stays in use today have resulted in some improvement, additional strength and rigidity without excess weight is still desirable.

SUMMARY OF THE INVENTION

A bicycle frame with improved strength and rigidity has been developed. The frame utilizes a wishbone stay with an improved design. Further, in preferred embodiments, the improved wishbone stay is used for both the upper and lower stays.

The improved wishbone stay comprises a U-shaped tubular member having a curved portion and two leg portions, the leg portions positioned to straddle the rear wheel, and a second tubular member, a stem tube, extending between the truss portion of the frame and the curved portion of the U-shaped tubular member. The stem tube is shaped at one end so as to terminate in gussets that at least partially surround the curved portion of the U-shaped member.

The U-shaped member is formed from one unbroken length of tubing, which produces greater frame rigidity. The design of the stem tube allows for simple, low cost, yet strong attachment between the stem tube and the U-shaped tubular member. The design produces a frame with increased rear-end rigidity, which in turn improves pedaling ease and avoids inefficient deflection of the frame at each pedal stroke. The design also improves the strength of the frame.

In the preferred embodiment, the same size and shape of U-shaped members are used in both the upper and lower stays. This allows for interchangability of the parts, lowering production costs. Also, preferred embodiments of the wishbone include a mounting hole for either a caliper brake or kickstand assembly on the stem tube. The hole is placed close to the gussets so that the strength of the U-shaped tube helps to prevent the stem tube wall from collapsing when a nut and bolt used to attach the brake or kickstand assembly is torqued. Further strength is provided by an annular tube spacer inside the tube, concentric with the mounting hole.

These and other advantages, as well as the invention itself, will be best understood in reference to the accompanying drawings.

BRIEF DESCRIPTION OF THE DRAWINGS

FIG. 1 is an elevational view of part of a bicycle utilizing one embodiment of the frame of the present invention.

FIG. 2 is a sectional view taken along line 2—2 of FIG. 1.

FIG. 3 is an enlarged sectional view similar to FIG. 2 but without the brake assembly.

FIG. 4 is a cross-sectional view taken along line 4—4 of FIG. 3.

FIG. 5 is a cross-sectional view taken along line 5—5 of FIG. 3.

FIG. 6 is an elevational view of another preferred embodiment of the present invention, utilizing two wishbone stays of the improved design.

FIG. 7 is a sectional view taken along line 7—7 of FIG. 6.

FIG. 8 is a sectional view taken along line 8—8 of FIG. 6.

DETAILED DESCRIPTION OF THE DRAWINGS AND PREFERRED EMBODIMENTS OF THE INVENTION

Figure 10:
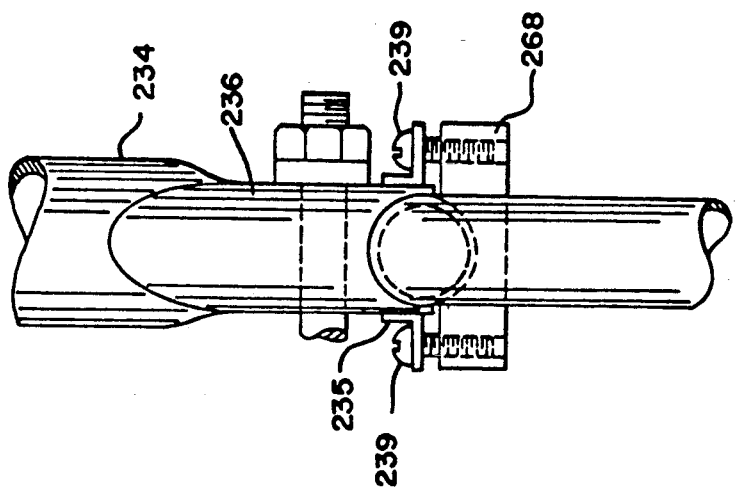
FIG. 10 is a sectional view taken along line 10—10 of FIG. 9.

FIG. 1 shows a portion of a bicycle utilizing a frame 10 of one preferred embodiment of the present invention. The truss portion of frame 10 includes a head tube (not shown) a pedal crank housing 18, a top tube 20, a seat mast 22 and a down tube 24. The seat mast 22 extends upwardly from the pedal crank housing 18 for mounting a bicycle seat 28 in a manner commonly known in art. Likewise pedals and a chain ring assembly 26 are mounted on the frame 10 in a commonly known manner.

The frame 10 also includes an upper stay 30 extending between the seat mast 22 and a rear wheel mounting bracket 62, and a lower stay 40 extending between the pedal crank housing 18 and the rear wheel mounting bracket 62. The rear wheel mounting bracket 62 may include numerous gears and/or a quick release dropout lugs for the rear wheel 64, as is conventional in the art.

In the embodiment of FIG. 1, only the upper stay 30 is constructed using the improved wishbone design of the present invention. As shown in more detail in FIGS. 2-5, the upper stay 30 comprises a first tubular member 31 and a second tubular member or stem tube 34. The first tubular member 31 is bent into a U-shaped configuration with a curved portion 32 and two leg portions 33 positioned to straddle the rear wheel 64, and terminate at the rear wheel mounting bracket 62. The second tubular member 34 extends between the seat mast 22 and the curved portion 32 of the first tubular member 31, and terminates in gussets 37. In the preferred embodiment, the second tubular member 34 has a flattened portion 36 near its bottom end. The resulting elliptical cross-sectional shape (FIG. 5) has an inside minor axis dimension substantially equal to the outside diameter of the first tubular member 31 (FIG. 4). The first tubular member 31 has a substantially uniform diameter throughout the curved portion 32.

As shown in FIGS. 3 and 4, the gussets 37 extend to approximately the center line of the first tubular member 31. Welds 39 are formed at each area of contact between the first and second tubular members 31 and 34. Also in the preferred embodiment, and as best shown in FIG. 4, mounting holes suitable for mounting a brake assembly 50 (FIGS. 1 and 2) are formed through the front and back side walls of the flattened portion 36 of the second tubular member 34. Bolt 52 extending through the mounting holes, nut 54 and washer 56 are used to hold the brake assembly 50 to the stay 30. Preferably the mounting holes are in close enough proximity to the gussets 37 and the curved portion 32 of the U-shaped member 31 such that those elements help to prevent collapse of the walls of the second tubular member 34 when nut 54 and bolt 52 are torqued.

Also, preferably an annular tube spacer 38 is placed inside the second tubular member 34 concentric with the mounting holes. The hole in the back tube wall is smaller in diameter than the outside diameter of the tube spacer 38, yet on the front wall, the mounting hole is large enough so that the tube spacer 38 can be inserted into the tube 34 through the front mounting hole. While the tube spacer 38 thus butts up against the inside surface of the back wall of tube 34, it is flush with the outside surface of the front wall of tube 34. In those embodiments where the tube 34 is flattened, the tube spacer 38 can butt up against and be flush with two flat surfaces of flattened portion 36. The tube spacer 38, as well as the position of the mounting holes proximate the curved portion 32 of the U-shaped member 31, cooperate to allow the nut 54 to be torqued onto bolt 52 without fear of collapsing the front and back walls of stem tube 34.

FIG. 6 shows a portion of a bicycle utilizing a frame 110 of a second preferred embodiment of the present invention. As shown in FIGS. 6 and 7, the upper rear stay 130 is the same as the upper rear stay 30 on frame 10 of FIG. 1. Thus, each of the elements of FIGS. 6 and 7 are numbered with the same reference number, increased by an addend of 100, as the corresponding elements in FIGS. 1 and 2. The only difference between the frames 10 and 110 is that the lower stay 140 of frame 110 also utilizes the improved wishbone design of the present invention, as shown in FIG. 8.

The stay 140 is identical to the stay 130, and thus to the stay 30, except for the length of the stem tube 144, and also in that the forward end of stem tube 144 is configured to butt up against the pedal crank housing 118. Reference numbers in FIG. 8 are increased by an addend of 10 to represent the same elements as in FIG. 7. Thus 143 represents the leg portions of the U-shaped tubular member 141 in FIG. 8, just as 133 represents the leg portions of the U-shaped tubular member 131 in FIG. 7.

Stem tube 144 also includes mounting holes and a tube spacer similar to the tube spacer 38. Just as with the mounting holes in stem tube 134 and stem tube 34, the mounting holes in stem tube 144 are formed in close proximity to where gussets 147 attach to the curved portion 142 of U-shaped member 141. The mounting holes are positioned to hold a kickstand assembly 180 onto the bottom of the lower stay 140 by a nut and bolt like nut 54 and bolt 52.

Figure 9:
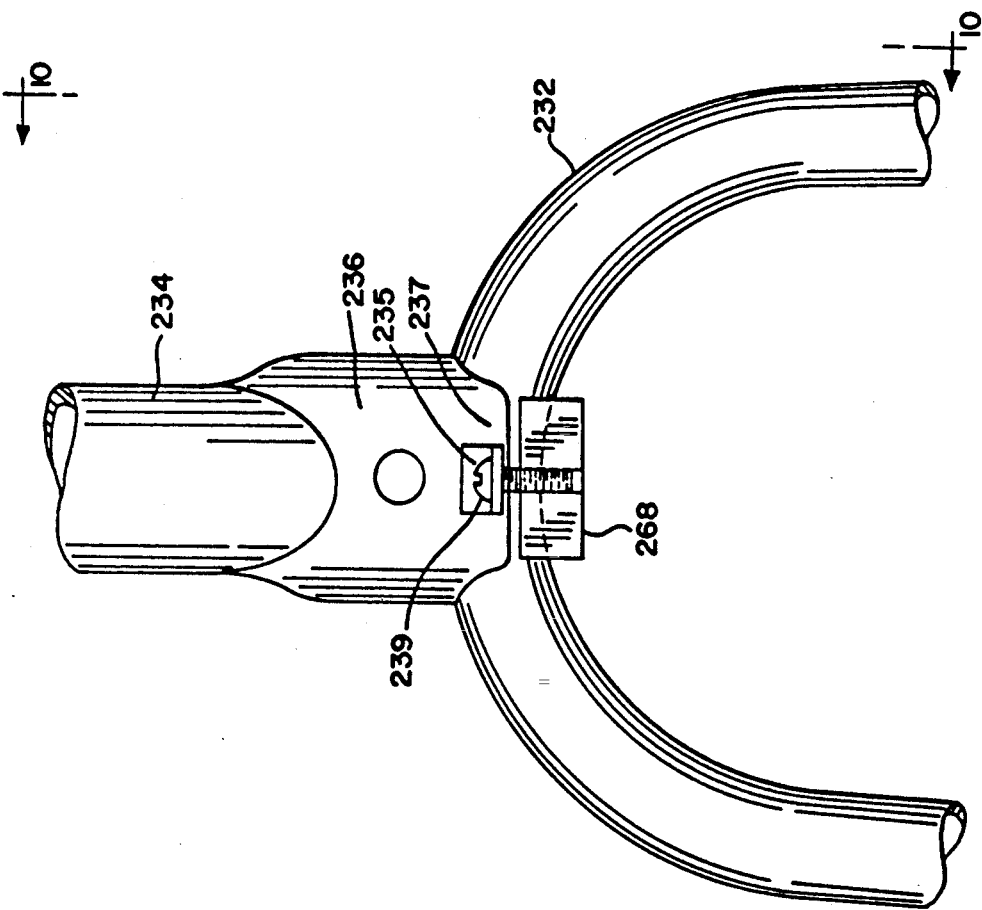
FIG. 9 is a view like FIG. 3 of another embodiment of the present invention.

FIGS. 9 and 10 show a less preferred method of connecting the two pieces of the wishbone of FIG. 3 together. As in the other embodiments, the stem tube 234 has a flattened portion 236 terminating in gussets 237. The gussets 237 include tabs 235. A bracket 268 fits against the back side of curved portion 232 opposite the tube 234. Two bolts 239 are used to hold the gussets 237, via tabs 235, to the bracket 268 and thus to the curved portion 232. The tabs 235 can be welded, brazed or otherwise attached to the gussets 237. Also, the tabs 235 could be punched and bent over sections of the gussets themselves.

In addition to the rigidity and strength of the present invention discussed above, added strength and rigidity is produced by cold working the U-shaped members 31, 131 and 141. A straight piece of tubing is bent over a die to maintain its round cross section. It is bent at a speed slow enough to avoid forming wrinkles in the tube wall, as is well known in the art. This cold working increases the strength of the tubing itself in the curved portion 32, which results in greater rigidity of the stays to oppose lateral bending of the frame 10.

The preferred materials of construction for the frame members 10 and 110 is 18 gauge steel tubing, though alloys can be used when lighter weight frames are desired. The seat mast 22 and stem tube 34 preferably have an outside diameter of 1⅛ inches, while the U-shaped member 31 preferably has an outside diameter of ⅞ inch. The gussets 37 are as wide as possible, preferably at least as wide as the diameter of the stem tube 34. The large width is preferred since it gives greater area for welds 39, resulting in greater strength and rigidity. The diameter of the stem tube 34 is preferably as wide as possible, taking into account that if it is wider than the seat mast 22, its connection to the seat mast will be more complicated.

The tube spacer 38 is preferably about ½-inch long with a ⅜-inch O.D. and ¼-inch I.D., made by roll forming a flat piece of steel. The mounting holes are made so that the spacer 38 may be pressed into the mounting hole and butt up against the inside of the back wall of the stem tube 34. In the preferred embodiment shown in FIG. 4, the hole in the front wall is made by piercing the metal inward so as to bend in the tube wall, forming a guide for the tube spacer 38. The hole is slightly smaller than the outside diameter of the spacer 38. During insertion, the spacer 38 is forced to a smaller diameter, plus the hole enlarges slightly, securing the spacer 38 firmly in the mounting hole.

In the preferred embodiment, the bottom end of stem tube 34 is first notched and then flattened, the notching being designed so that after the end is flattened, the shape of the notches and gussets 37 will be within standard welding tolerances of the shape of the curved portion 32 to which they attach. The preferred welds 39 are MIG welds, although other types of connections may be used, such as TIG welds, brazing, adhesives, nuts and bolts, rivets and the like. By flattening the stem tube 34, the gussets 37 come down straight over the side of the U-shaped member 31. Welds 39 can then be made while the U-shaped member 31 is held in place in the notch made in the flattened end of stem tube 34, without further forming operations. However, the welds 39 cover sufficient surface area to provide strong attachment between the stem tube 34 and U-shaped member 31.

It should be appreciated that the structures and methods of the present invention are capable of being incorporated in the form of a variety of embodiments, only a few of which have been illustrated and described above. The invention may be embodied in other forms without departing from its spirit or essential characteristics. For example, the gussets 37 could be longer and further surround the curved member 32, though this would require additional manufacturing steps to bend the gussets 37 around the curved portion 32 of the U-shaped member 31. It may also be possible to achieve the same strength benefits of the present invention, though with greater cost, by using a casting to connect the stem tube 34 and the U-shaped member 31.

The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A bicycle frame having a truss portion including a pedal crank housing and a seat mast extending upwardly from the pedal crank housing, and upper and lower stays for connecting a rear wheel to the truss portion, wherein at least one of the stays comprises:
   (a) a U-shaped tubular member having a curved portion and two leg portions, the leg portions positioned to straddle the rear wheel; and
   (b) a second tubular member extending between the truss portion of the frame and the curved portion of the U-shaped tubular member, the second tubular member being shaped at one end so as to terminate in gussets that at least partially surround the curved portion of the U-shaped member, the second tubular member being flattened near the gussets.

2. The bicycle frame of claim 1 wherein the tubing used to form the U-shaped member is of substantially uniform diameter throughout the curved portion.

3. The bicycle frame of claim 1 wherein the first tubular member is metal and has greater strength in the curved portion than in the leg portion due to cold working of the metal by bending an originally straight tube so as to form the curved portion.

4. The bicycle frame of claim 1 wherein mounting holes are formed through the walls of the second tubular member in close enough proximity to the gussets so that the cooperation of the gussets with the curved portion of the U-shaped tubular member helps to prevent collapse of the walls of the second tubular member when a nut is torqued on a bolt inserted through the holes.

5. The bicycle frame of claim 1 wherein the gussets are secured to the curved portion of the second tubular member by welds.

6. The bicycle frame of claim 1 wherein the gussets are secured to the curved portion of the second tubular member by bolting to a bracket that fits on the curved portion of the first tubular member opposite the second tubular member.

7. The bicycle frame of claim 1 wherein mounting holes are formed through front and back side walls of the second tubular member and an annular tube spacer is placed inside the second tubular member concentric with the mounting holes.

8. The bicycle frame of claim 7 wherein the diameter of the mounting hole through one of the front and back tube walls is less than the outer diameter of the tube spacer and the diameter of the mounting hole through the other of the front and back tube walls is large enough so that the tube spacer can be inserted into the tube through the mounting hole in said other tube wall.

9. The bicycle frame of claim 8 wherein the tube spacer is positioned so as to butt up against the inside of the said one tube wall and be flush with the outside of the said other tube wall.

10. The bicycle frame of claim 1 wherein the at least one stay comprises an upper stay.

11. The bicycle frame of claim 1 where the at least one stay comprises a lower stay.

12. The bicycle frame of claim 1 wherein both the upper and lower stays comprise said U-shaped and second tubular members as described in claim 1.

13. A bicycle frame having a truss portion, including a pedal crank housing and a seat mast extending upwardly from the pedal crank housing for mounting a bicycle seat on the frame, and upper and lower stays for connecting a rear wheel to the truss portion of the frame, the upper stay running between the seat mast and a rear wheel mounting bracket and the lower stay running between the pedal crank housing and the rear wheel mounting bracket, wherein at least one of the stays comprises:

(a) a first tubular member bent in a U-shaped configuration with a curved portion and two substantially equal length leg portions, the leg portions positioned to straddle the rear wheel, and (b) a second tubular member extending between the truss portion of the frame and the curved portion of the first tubular member, the second tubular member being shaped at a first end to butt up against the truss portion of the frame and at a second end to terminate in gussets that at least partially surround the curved portion of the first member, the second end also being flattened into an elliptical cross-sectional shaped with an inside minor axis dimension substantially equal to the outside diameter of the first tubular member.

14. The bicycle frame of claim 13 wherein mounting holes are formed through first and second opposite tube walls of the flattened portion of the second tubular member and an annular tube spacer is placed inside the second tubular member concentric with the mounting holes.

15. The bicycle frame of claim 14 wherein the diameter of the mounting hole through the first tube wall is less than the outer diameter of the tube spacer and the diameter of the mounting hole through the second tube wall is large enough so that the tube spacer can be inserted into the tube through the mounting hole in the second tube wall.

16. The bicycle frame of claim 15 wherein the tube spacer is positioned so as to butt up flat against the inside of the first tube wall and be flush with the outside of the second tube wall.

17. The bicycle frame of claim 14 wherein one of the mounting holes is made by piercing the tube wall such that portions of the tube wall extend into the inside of the tube.

18. The bicycle frame of claim 13 wherein the first tubular member is metal and has greater strength in the curved portion than in the leg portion due to cold working of the metal by bending an originally straight tube so as to form the curved portion.

19. The bicycle frame of claim 13 wherein the gussets extend to approximately the centerline of the first tubular member and welds are formed at each area of contact between the first and second tubular members.

20. A bicycle frame having
(a) a pedal crank housing;
(b) a seat mast extending upwardly from the pedal crank housing;
(c) an upper stay comprising:
   (i) a first U-shaped tubular member having a curved portion and two leg portions, the leg portions terminating at rear wheel connecting brackets, and
   (ii) a first stem tube extending between the curved portion of the first U-shaped tubular member and the seat mast and shaped at a first end to butt up against the seat mast and flattened at a second end so as to have an elliptical cross-section with an inside minor axis dimension substantially equal to the outside diameter of the first U-shaped tubular member, the flattened portion extending in gussets that at least partially surround said curved portion; and (d) a lower stay comprising:
   (i) a second U-shaped tubular member having a curved portion and two leg portions, the leg portions of the second U-shaped tubular member also terminating at the rear wheel connecting brackets, and
   (ii) a second stem tube extending between the curved portion of the second U-shaped tubular member and the pedal crank housing and shaped at a first end to butt up against the pedal crank housing and flattened at a second end so as to have an elliptical cross-section with an inside minor axis dimension substantially equal to the outside diameter of the second U-shaped tubular member, the flattened portion extending in gussets that at least partially surround the curved portion of the second U-shaped tubular member.

21. The bicycle frame of claim 20 wherein each of the first and second stem tubes include mounting holes extending through the flattened portions of the stem tubes with annular tube spacers inside the tubes concentric with the respective mounting holes, the mounting holes in the first stem tube positioned and configured to mount a brake assembly and the mounting holes in the second stem tube positioned and configured to mount a kickstand assembly.

22. The bicycle frame of claim 20 wherein the first and second U-shaped tubular members are the same size and shape.

23. A bicycle frame having a truss portion including a pedal crank housing and a seat mast extending upwardly from the pedal crank housing, and upper and lower stays for connecting a rear wheel to the truss portion, wherein at least one of the stays comprises:

(a) a U-shaped tubular member having a curved portion and two leg portions, the leg portions positioned to straddle the read wheel;

(b) a second tubular member extending between the truss portion of the frame and the curved portion of the U-shaped tubular member, the second tubular member being shaped at one end so as to terminate in gussets that at least partially surround the curved portion of the U-shaped member; and (c) mounting holes formed through the walls of the second tubular member in close enough proximity to the gussets so that the cooperation of the gussets with the curved portion of the U-shaped tubular member helps to prevent collapse of the walls of the second tubular member when a nut is torqued on a bolt inserted through the holes.

24. A bicycle frame having a truss portion including a pedal crank housing and a seat mast extending upwardly from the pedal crank housing, and upper and lower stays for connecting a rear wheel to the truss portion, wherein at least one of the stays comprises:

(a) a U-shaped tubular member having a curved portion and two leg portions, the leg portions positioned to straddle the rear wheel;

(b) a second tubular member extending between the truss portion of the frame and the curved portion of the U-shaped tubular member, the second tubular member being shaped at one end so as to terminate in gussets that at least partially surround the curved portion of the U-shaped member; and (c) mounting holes formed through front and back side walls of the second tubular member and an annular tube spacer placed inside the second tubular member concentric with the mounting holes.

25. The bicycle of claim 24 wherein the diameter of the mounting hole through one of the front and back tube walls is less than the outer diameter of the tube spacer and the diameter of the mounting hole through the other of the front and back tube walls is large enough so that the tube spacer can be inserted into the tube through the mounting hole in said other tube wall.

26. The bicycle frame of claim 25 wherein the tube spacer is positioned so as to butt up against the inside of the said one tube wall and be flush with the outside of the said other tube wall.

* * * * *

UNITED STATES PATENT AND TRADEMARK OFFICE
CERTIFICATE OF CORRECTION

PATENT NO. : 5,129,665
DATED : July 14, 1992
INVENTOR(S) : Edmund E. Sutter et al.

It is certified that error appears in the above-indentified patent and that said Letters Patent is hereby corrected as shown below:

On the title page, under OTHER PUBLICATIONS, line 3, delete "Tange" and substitute therefor --TANGE--.

On the title page, in the ABSTRACT, line 24, delete "allows" and substitute therefor --allow--.

Column 27, line 7, delete "holes" and substitute therefor --hole--.

Column 40, line 8, delete "read" and substitute therefor --rear--.

Signed and Sealed this

Twenty-fifth Day of October, 1994

Attest:

BRUCE LEHMAN

*Attesting Officer*   *Commissioner of Patents and Trademarks*